(12) United States Patent
Jonnala et al.

(10) Patent No.: US 7,613,127 B2
(45) Date of Patent: Nov. 3, 2009

(54) VERIFYING PACKETS RECEIVED OVER A PHYSICAL LINK

(75) Inventors: Premkumar Jonnala, Hayward, CA (US); Keith McCloghrie, Pawling, NY (US); Norman William Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 544 days.

(21) Appl. No.: 11/075,189

(22) Filed: Mar. 7, 2005

(65) Prior Publication Data
US 2006/0198328 A1 Sep. 7, 2006

(51) Int. Cl.
G01R 31/08 (2006.01)
G06F 1/00 (2006.01)
G06F 11/30 (2006.01)
H04J 3/16 (2006.01)
H04J 3/24 (2006.01)
H04J 3/00 (2006.01)

(52) U.S. Cl. .................. 370/252; 370/469; 370/475; 370/476; 713/300; 713/340

(58) Field of Classification Search .............. 370/282, 370/389, 395.2, 395.43, 254, 255, 257, 449, 370/FOR. 150, 318; 709/220, 222, 227, 709/228, 221; 713/100, 300, 340
See application file for complete search history.

(56) References Cited

U.S. PATENT DOCUMENTS

| | | | |
|---|---|---|---|
| 5,495,475 A * | 2/1996 | Franaszek et al. ........... 370/389 |
| 5,793,987 A | 8/1998 | Quackenbush et al. | |
| 6,026,494 A | 2/2000 | Foster | |
| 6,457,055 B1 * | 9/2002 | Hwong et al. ............... 709/227 |
| 6,721,335 B1 * | 4/2004 | Gregg ........................ 370/473 |
| 6,732,190 B1 * | 5/2004 | Williams et al. ............ 709/250 |
| 6,826,179 B1 * | 11/2004 | Talbot et al. ................ 370/389 |
| 6,944,156 B2 * | 9/2005 | Suzuki ....................... 370/389 |
| 6,963,985 B2 * | 11/2005 | Stachura et al. ............ 713/310 |
| 7,031,266 B1 | 4/2006 | Patel et al. | |
| 7,263,077 B1 * | 8/2007 | Hamalainen et al. ........ 370/311 |
| 7,278,039 B1 * | 10/2007 | Lo ............................. 713/320 |
| 7,298,700 B1 * | 11/2007 | Doverspike et al. ......... 370/235 |
| 7,325,075 B1 * | 1/2008 | Chiu et al. .................. 709/245 |
| 7,392,407 B2 | 6/2008 | Jonnala et al. | |
| 7,403,542 B1 * | 7/2008 | Thompson .................. 370/474 |
| 7,412,515 B2 * | 8/2008 | Kupst et al. ................. 709/226 |
| 2002/0080438 A1 * | 6/2002 | Beine et al. ................. 359/110 |
| 2002/0141217 A1 | 10/2002 | Cohen et al. | |
| 2003/0123486 A1 * | 7/2003 | Lacey, III .................... 370/485 |
| 2003/0163224 A1 | 8/2003 | Klaar et al. | |
| 2003/0179713 A1 * | 9/2003 | Fleming ...................... 370/252 |
| 2003/0225864 A1 * | 12/2003 | Gardiner et al. ............. 709/220 |
| 2004/0148427 A1 * | 7/2004 | Nakhjiri et al. ............. 709/237 |
| 2005/0094637 A1 * | 5/2005 | Umesawa et al. ........... 370/389 |
| 2005/0118987 A1 * | 6/2005 | Isozaki et al. ............. 455/412.1 |

(Continued)

Primary Examiner—Seema S Rao
Assistant Examiner—Xavier Szewai Wong
(74) Attorney, Agent, or Firm—Bainwood Huang

(57) ABSTRACT

A solution is provided wherein physical link parameters may be negotiated after a link is brought up by having the two devices involved in the link exchange identifiers when the link is initially brought up. These identifiers may be saved in the devices and then utilized upon receipt of subsequent physical link parameter negotiation packets to ensure that these packets are received by a partner who is connected via a physical link.

24 Claims, 6 Drawing Sheets

U.S. PATENT DOCUMENTS

2005/0226267 A1* 10/2005 Pedersen et al. ............ 370/465
2005/0243749 A1* 11/2005 Mehrabanzad et al. ... 370/310.2
2006/0072505 A1* 4/2006 Carrillo et al. .............. 370/331
2007/0233199 A1* 10/2007 Moore et al. ................... 607/6

* cited by examiner

VERIFYING PACKETS RECEIVED OVER A PHYSICAL LINK

FIELD OF THE INVENTION

The present invention relates to the field of physical links between devices in computer networks. More specifically, the present invention relates to the verifying of packets received over a physical link.

BACKGROUND OF THE INVENTION

For many years, computer networks have allowed computing devices to communicate with each other over network links. Despite the growing wireless networking market, many home and corporate networks still rely heavily on physical links, where devices are networked with each other through wires (most commonly, using the Ethernet standard).

When a device is added to a network (and hence, a physical link is established with at least one other device in the network), a number of steps must occur. First, the device must negotiate a physical link with another device in the network. Once that has been established, the devices may then be linked up. Following that, the devices are free to negotiate any parameters they wish regarding layer 2 and higher communications.

At the physical link negotiation stage, IEEE 802.3 provides for a number of physical link parameters that may be negotiated. However, these physical link parameters are limited to those specifically described in the IEEE 802.3 standard. Thus, there is currently no ability to negotiate physical link parameters that were not anticipated by the IEEE 802.3 standard, restricting a company's ability to utilize new physical link parameters in their devices. Furthermore, even for parameters that are described in the IEEE 802.3 standard, there may be times when it is desired to re-negotiate the parameters after the link has been established (e.g., if circumstances change). Current systems lack this ability.

An example of this may be seen in the realm of powering devices using physical links. Savvy businesses have begun to take advantage of the fact that it is possible to transmit power over Ethernet cables. This allows for devices attached to the cables to be powered without the need for batteries or an external plug. For example, an Internet telephone device may be completely powered by the same wire that it uses to transmit and receive voice communications. IEEE 802.3 allows devices to set a "powered" parameter when the link is established, so that the device transmitting the power knows it is safe to do so. However, modern devices may include multiple power settings. For example, if power at the transmitting side is limited, it may be beneficial to have Internet telephones that can operate at less than full power (e.g., eliminating the speakerphone capability on the fly should power availability drop). Such a system, however, is not possible with the current standards for a couple reasons. First, IEEE 802.3 does not provide for the ability to set this type of parameter at the time the link is negotiated. Second, even if it did, there is no mechanism to renegotiate the parameter on the fly while the link is active (e.g., if power availability drops or is diverted to other devices).

Thus, what is needed is a solution that allows for physical link parameters to be negotiated after the physical link has been established. Layer 2 protocol packets could be used for such a feature, but doing so presents a design challenge in networks that may include bridges and repeaters. That is because these devices could potentially lie in between the device transmitting the layer 2 protocol packets and the device ultimately receiving the layer 2 protocol packets, while being transparent to the layer 2 protocol packets. Thus, it is possible that the two endpoint devices may believe they have a direct physical link between them when in reality, a bridge or repeater is between them. Such a condition would throw into doubt any of the layer 2 negotiations that involve physical link parameters. What is needed is a solution that overcomes these drawbacks.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
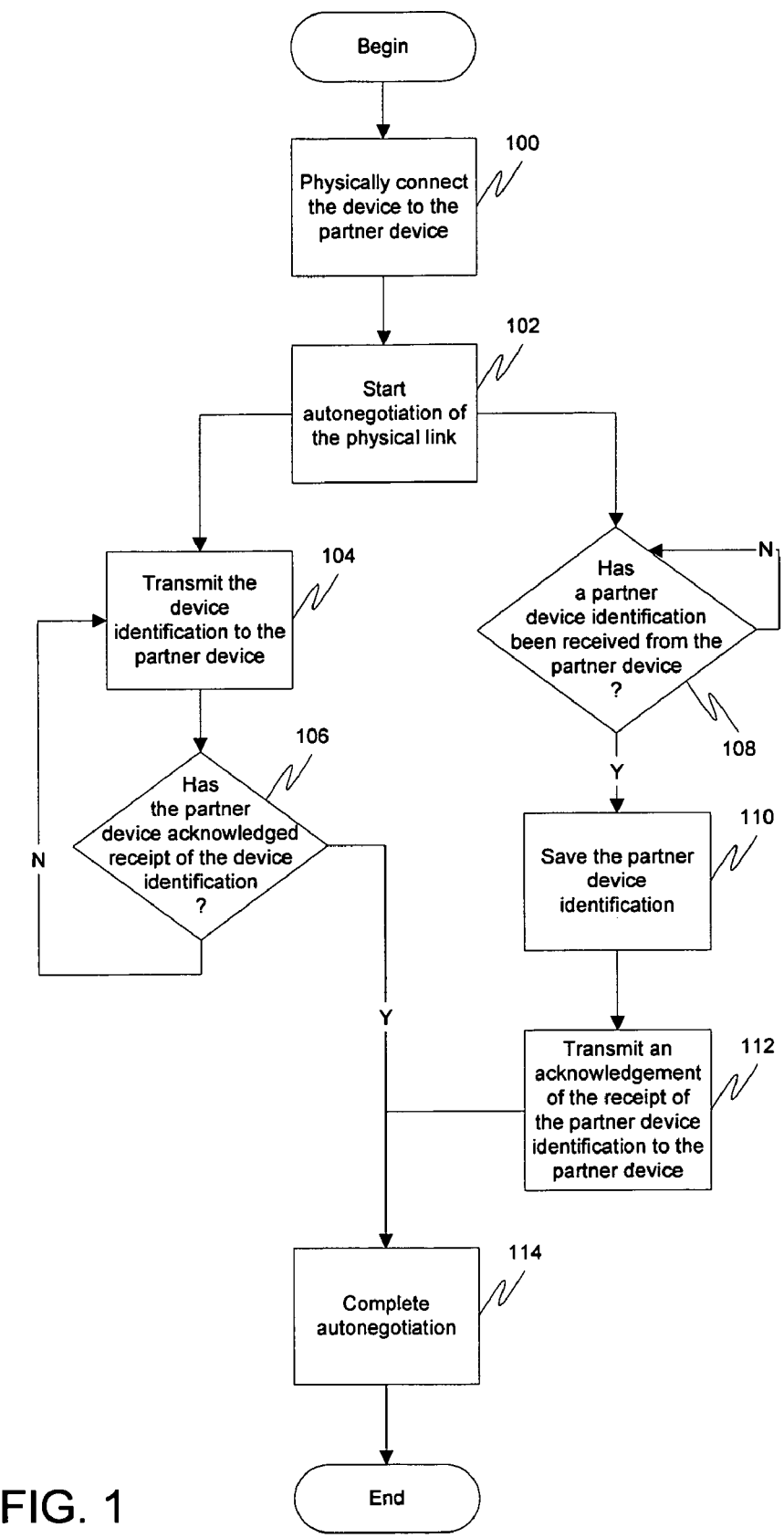
FIG. 1 is a flow diagram illustrating a method for establishing a physical link between a device and a partner device in accordance with an embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems, computing platforms, firmware, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

One embodiment of he present invention allows physical link parameters to be negotiated after a link is brought up by having the two devices involved in the link exchange identifiers when the link is initially brought up. These identifiers may be saved in the devices and then utilized upon receipt of subsequent physical link parameter negotiation packets to ensure that these packets are received by a partner who is connected via a physical link.

Throughout this application, the negotiation of the physical link parameters may be discussed in terms of performing the negotiation using layer 2 protocol packets. However, one of ordinary skill in the art will recognize that the physical link parameters may actually be negotiated at any point after the physical link has been brought up, and thus any functioning protocol at that point may be used.

FIG. 1 is a flow diagram illustrating a method for establishing a physical link between a device and a partner device in accordance with an embodiment of the present invention. This method will be described in terms of the steps taken by a single device. However, one of ordinary skill in the art will recognize that a physical link requires devices on both ends, and thus a similar method may be performed on the other device. This other device may be termed the "partner device".

At 100, the device may be physically connected to the partner device. Physically connected can include many different types of connections, but for purposes of this document, "physically connected" should be read to mean any type of connection in which the negotiation of physical link parameters may be desired. At 102, autonegotiation of the physical link may be started. At this stage, two different tasks may be undertaken. First, the device may continuously transmit its identification to the partner device, until the partner device acknowledges receipt of the identification. Thus, at 104, the device identification is transmitted to the partner device. Then, at 106, it is determined if the partner device has acknowledged receipt of the device identification. If not, then the process loops back to 104. The second task to be performed is to receive a partner device identification from the partner device by continuously watching for the receipt of the partner device identification. Thus, at 108, it may be determined if a partner device identification has been received from the partner device. If not, the process loops back to 108. If so, then at 110, the partner device identification may be saved. Then at 112, an acknowledgement of the receipt of the partner device identification may be transmitted to the partner device. It should be noted that both of these tasks (continuously transmitting the device identification and continuously scanning for receipt of the partner device identification) can be performed in any order, and may even be performed in parallel or multitasked. However, the process should not advance to the completion of autonegotiation until both of the tasks have completed. If that is the case, then at 114, autonegotiation may complete. At this point, the physical link has been "brought up", and the device has knowledge of both the device identification and the partner device identification (it is assumed the device has a mechanism for determining its own identification and thus no explicit saving of the device identification has been provided in this method).

Figure 2:
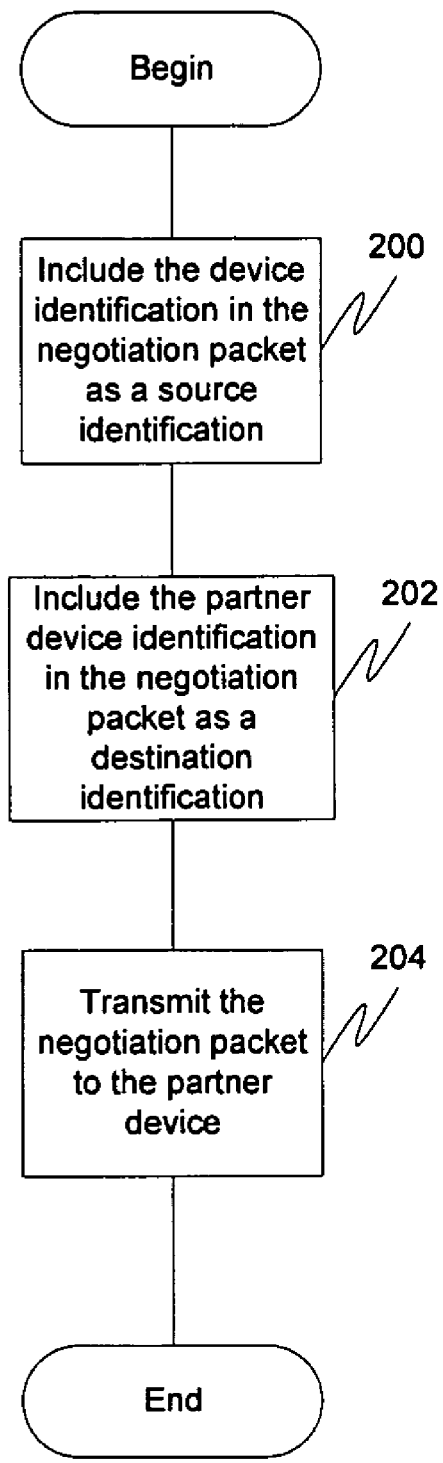
FIG. 2 is a flow diagram illustrating a method for transmitting a negotiation packet from a device to a partner device in accordance with an embodiment of the present invention.

FIG. 2 is a flow diagram illustrating a method for transmitting a negotiation packet from a device to a partner device in accordance with an embodiment of the present invention. This method may be performed at any stage after the physical link has been "brought up". In one embodiment of the present invention, this may be at the layer-2 level. At 200, the device identification may be included in the negotiation packet as a source identification. At 202, the partner device identification may be included in the negotiation packet as a destination identification. At 204, the negotiation packet may be transmitted to the partner device.

Figure 3:
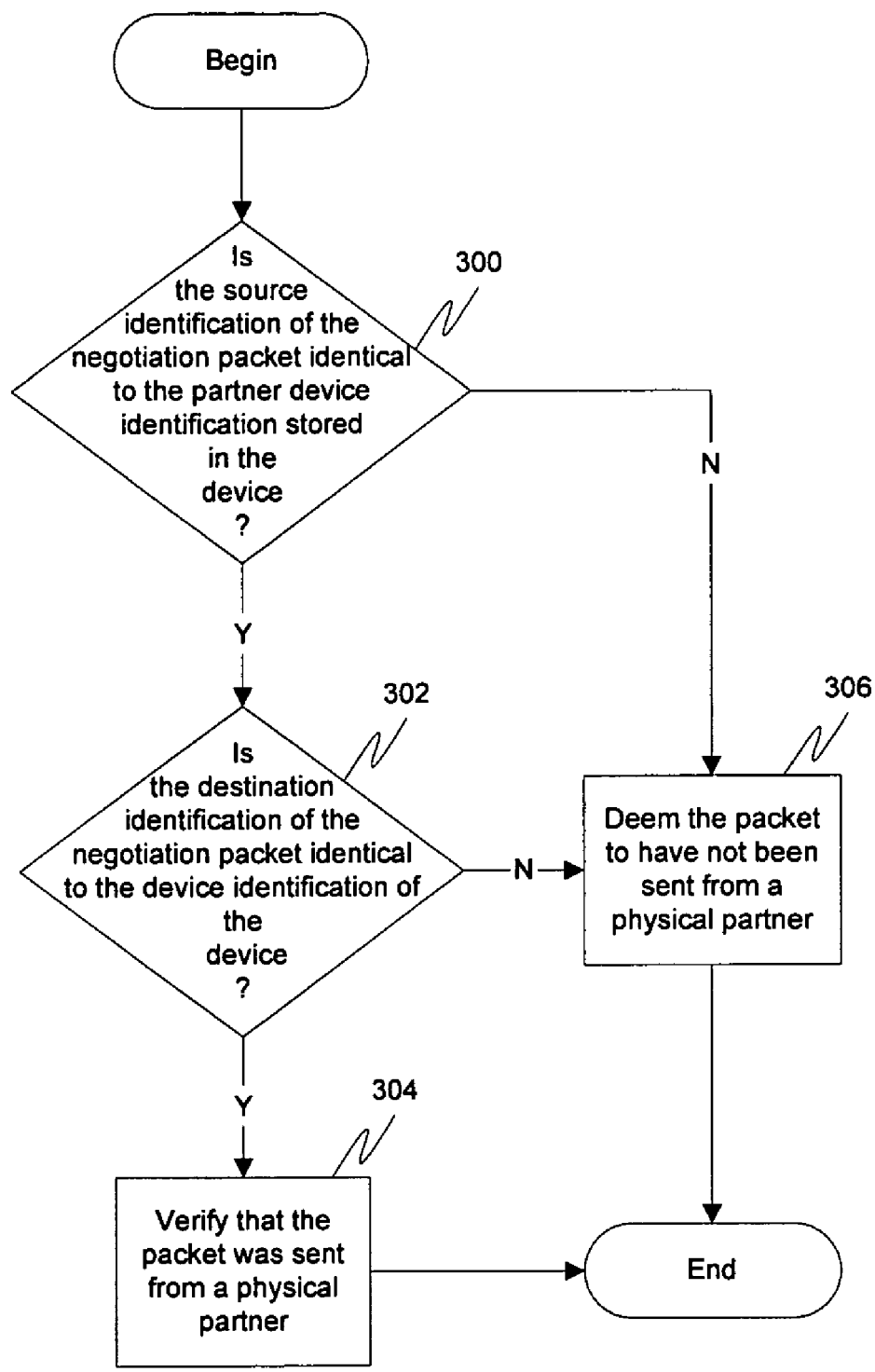
FIG. 3 is a flow diagram illustrating a method for receiving a negotiation packet at a device from a partner device in accordance with an embodiment of the present invention.

FIG. 3 is a flow diagram illustrating a method for receiving a negotiation packet at a device from a partner device in accordance with an embodiment of the present invention. As described above, if the negotiation packet was indeed transmitted from a partner device, it should contain the partner device identification in the source identification field and contain the device identification in the destination identification field. Thus, these two items may be checked. At 300, it may be determined if the source identification of the negotiation packet is identical to the partner device identification stored in the device. If so, then at 302 it may be determined if the destination identification of the negotiation packet is identical to the device identification of the device. If both of these are true, than at 304, the packet may be verified as having come from a physical partner. The repercussions of this will vary from system to system. The system may be designed, for example, to allow this packet to be used in the negotiation of physical link parameters. If one of these is untrue, then at 306, the packet will be deemed to have not come from a physical partner. The repercussions of this will vary from system to system. The system may be designed, for example, to disallow this packet to be used in the negotiation of physical link parameters. It may also be designed to discard the packet and send an error message. The invention, however, should not be restricted to such implementations, as the system may generally be designed to simply refuse to do one or more tasks that the negotiation packet is attempting to perform.

Figure 4:
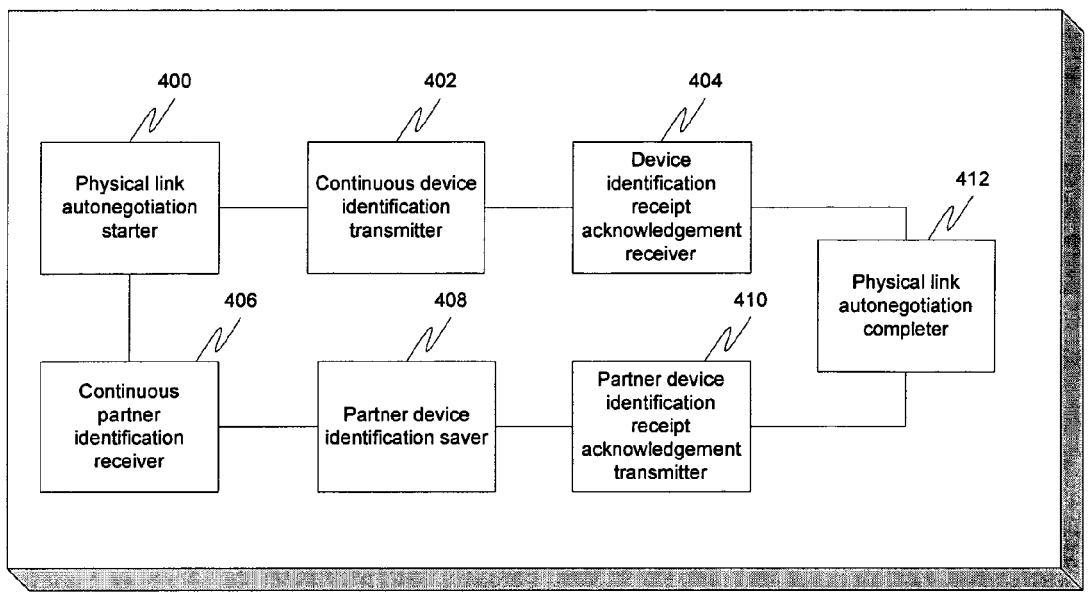
FIG. 4 is a block diagram illustrating an apparatus for establishing a physical link between a device and a partner device in accordance with an embodiment of the present invention.

FIG. 4 is a block diagram illustrating an apparatus for establishing a physical link between a device and a partner device in accordance with an embodiment of the present invention. This apparatus will be described in terms of the elements contained on a a single device. However, one of ordinary skill in the art will recognize that a physical link requires devices on both ends, and thus a similar apparatus may be located on the other device. This other device may be termed the "partner device".

The device may be physically connected to the partner device. Physically connected can include many different types of connections, but for purposes of this document, "physically connected" should be read to mean any type of connection in which the negotiation of physical link parameters may be desired. A physical link autonegotiation starter 400 may start autonegotiation of the physical link. At this stage, two different tasks may be undertaken. First, the device may continuously transmit its identification to the partner device, until the partner device acknowledges receipt of the identification, using a continuous device identification transmitter 402 coupled to the physical link autonegotiation starter 400. Then, a device identification receipt acknowledgement receiver 404 coupled to the continuous device identification transmitter 402 may determine if the partner device has acknowledged receipt of the device identification. If not, then the system continues to transmit the device identification until the acknowledgement is received.

The second task to be performed is to receive a partner device identification from the partner device by continuously watching for the receipt of the partner device identification using a continuous partner identification receiver 406 coupled to the physical link autonegotiation starter 400. Once the partner device identification is received, then a partner device identification saver 408 coupled to the continuous partner identification receiver 406 may save the partner device identification. Then a partner device identification receipt acknowledgment transmitter 410 coupled to the partner device identification saver 408 may transmit an acknowledgement of the receipt of the partner device identification to the partner device. It should be noted that both of these tasks (continuously transmitting the device identification and continuously scanning for receipt of the partner device identification) can be performed in any order, and may even be performed in parallel or multitasked. However, the process should not advance to the completion of autonegotiation until both of the tasks have completed. If that is the case, then a physical link autonegotiation completer 412 coupled to the device identification receipt acknowledgement receiver 404 and to the partner device identification receipt acknowledgement transmitter 410 may complete autonegotiation. At this point, the physical link has been "brought up", and the device has knowledge of both the device identification and the partner device identification (it is assumed the device has a mechanism for determining its own identification and thus no explicit saving of the device identification has been provided in this method).

Figure 5:
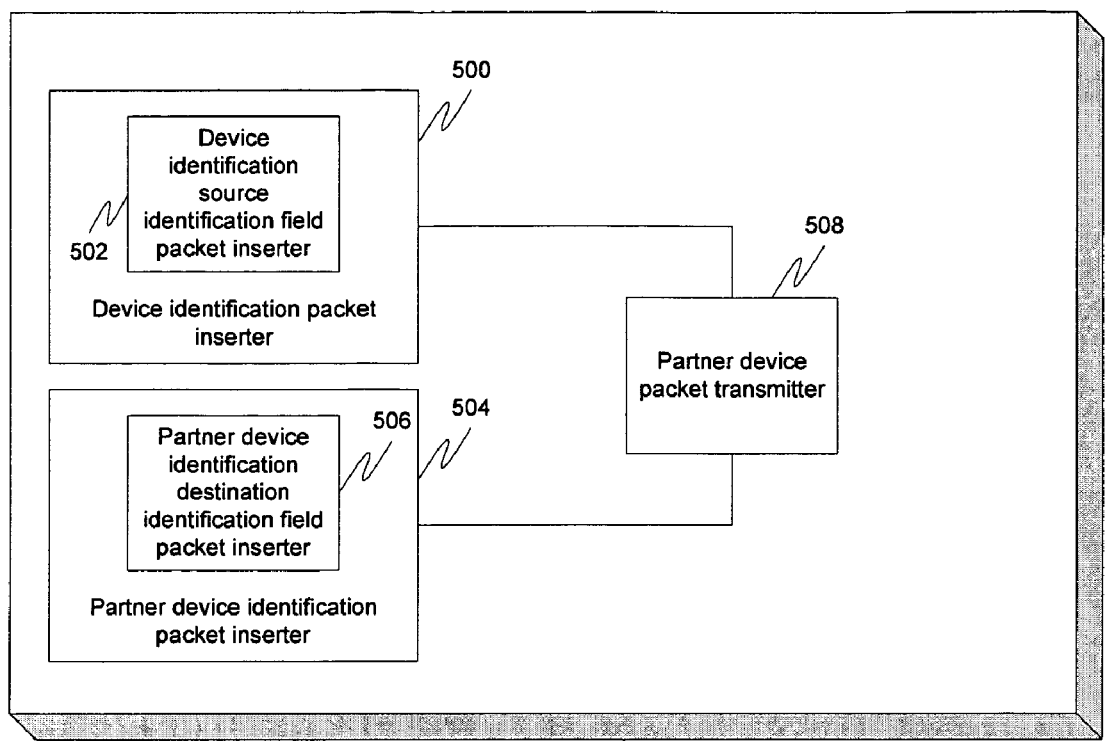
FIG. 5 is a block diagram illustrating an apparatus for transmitting a packet from a device to a partner device in accordance with an embodiment of the present invention.

FIG. 5 is a block diagram illustrating an apparatus for transmitting a packet from a device to a partner device in accordance with an embodiment of the present invention. This apparatus may perform these functions at any stage after the physical link has been "brought up." In one embodiment of the present invention, this may be at the layer-2 level. A device identification packet inserter 500 may include the device identification in the packet. This may include using a device identification source identification field packet inserter 502 to insert the device identification in a source identification field of the packet. A partner device identification packet inserter 504 may include the partner device identification in the packet. This may include using a partner device identification destination identification field packet inserter 506 to insert the partner device identification in a destination identification field of the packet. A partner device packet transmitter 508 coupled to the device identification packet inserter 500 and to the partner device identification packet inserter 504 may transmit the negotiation packet to the partner device.

Figure 6:
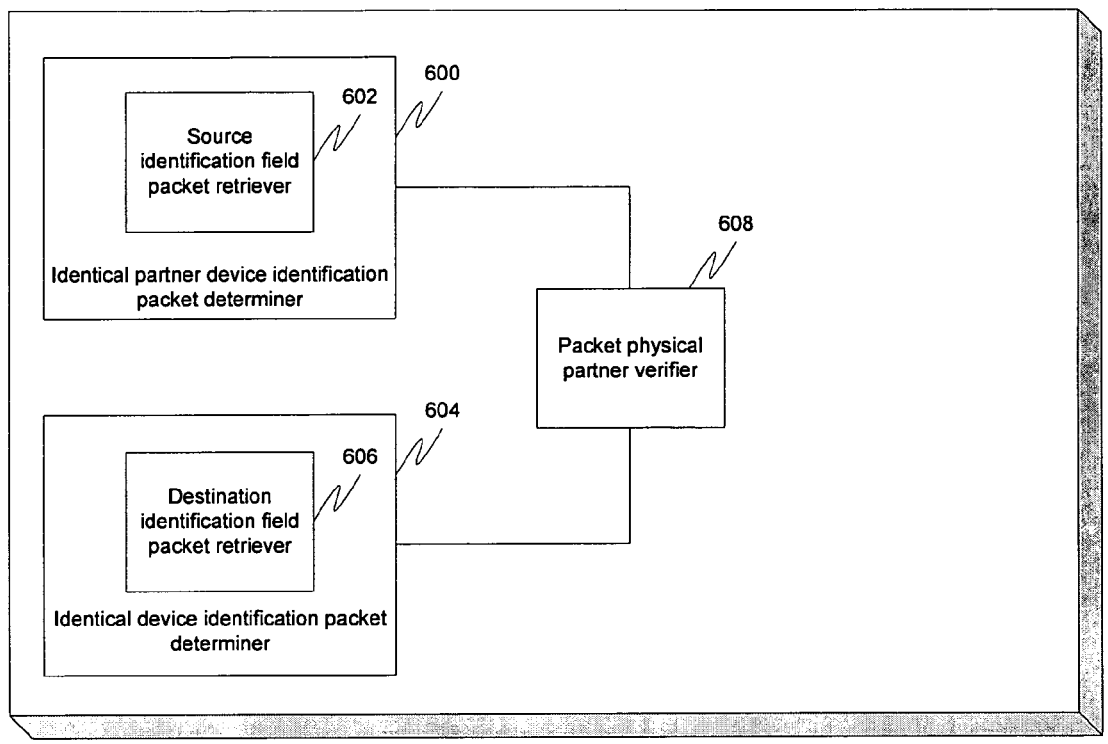
FIG. 6 is a block diagram illustrating an apparatus for receiving a packet at a device from a partner device in accordance with an embodiment of the present invention.

FIG. 6 is a block diagram illustrating an apparatus for receiving a packet at a device from a partner device in accordance with an embodiment of the present invention. As described above, if the packet was indeed transmitted from a partner device, it should contain the partner device identification in the source identification field and contain the device identification in the destination identification field. Thus, these two items may be checked. An identical partner device identification packet determiner 600 may determine if a partner identification contained in the packet is identical to the partner identification saved on the device. This may include determining if the source identification of the packet is identical to the partner device identification stored in the device using a source identification field packet retriever 602. If so, then an identical device identification packet determiner 604 may determine if a device identification in the packet is identical to an actual device identification of the device. This may include determining if the destination identification of the packet is identical to the device identification of the device using a destination identification field packet retriever 606. If both of these are true, than a packet physical partner verifier 608 coupled to the identical partner device identification packet determiner 600 and to the identical device identification packet determiner 604 may verified that the packet was sent from a physical partner. The repercussions of this will vary from system to system. The system may be designed, for example, to allow this packet to be used in the negotiation of physical link parameters. If one of these is untrue, then the link will be deemed to have not been sent from a physical partner. The repercussions of this will vary from system to system. The system may be designed, for example, to disallow this packet to be used in the negotiation of physical link parameters. The invention, however, should not be restricted to such implementations, as the system may generally be designed to refuse to do one or more tasks that the negotiation packet is attempting to perform.

In an embodiment of the present invention, the processes and apparatuses described above may be utilized to aid in the negotiation of physical link parameters using layer-2 negotiation packets. This would allows a system to renegotiate a physical link parameter that was previously negotiated when the physical link was first set up. This would also allow a system to negotiate parameters that are not available to be negotiated when the physical link was first set, for example, parameters not specified in IEEE 802.3. These capabilities have specific applicability to the negotiation of power levels. For example, a network containing an IP Phone may bring the phone up initially in a low power mode, and then allow the phone to later negotiate for more. As circumstances in the network change (such as more phones being connected), renegotiation may take place, allowing the system to vary the levels of power being provided to each phone based upon the phones' current needs and the status of the system.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for transmitting a physical link parameter negotiation packet from a first device to a second device connected by a physical link, the method comprising:

after establishment of the physical link between the first device and the second device inserting, by the first device, an identification of the first device into the physical link parameter negotiation packet, the physical link parameter negotiation packet configured as a layer-2 packet;

inserting, by the first device, an identification of the second device into the packet, the identification of the second device received from the second device during negotiation of the physical link; and transmitting, by the first device, the physical link parameter negotiation packet to the second device via a layer-2 protocol;

wherein transmitting, by the first device, the physical link parameter negotiation packet to the second device via a layer-2 protocol comprises identifying to the second device, via the physical link parameter negotiation packet, the first device as a device that is physically connected to the second device and negotiating with the second device, via the physical link parameter negotiation packet, a change in a physical link parameter associated with the physical link between the first device and the second device while the first device and the second device maintain the physical link there between;

further comprising receiving, by the first device from the second device, a change in the physical link parameter of the physical link connecting the first device and the second device in response to transmitting the physical link parameter negotiation packet to the second device;

wherein negotiating the change in a physical link parameter associated with the physical link between the first device and the second device comprises negotiating a change in an amount of power over Ethernet received by the first device from the second device from a first power level to a second power level, the second power level being greater than the first power level, while the first device and the second device maintain the physical link there between; and receiving the change in the physical link parameter of the physical link connecting the first device and the second device comprises receiving, from the second device, a change in the amount of power over Ethernet received by the first device from the second device from the first power level to the second power level while the first device and the second device maintain the physical link there between.

2. The method of claim 1, wherein the inserting includes inserting the identification of the first device into a source identification field of the physical link parameter negotiation packet.

3. The method of claim 1, wherein the inserting includes inserting the identification of the second device into a destination identification field of the physical link parameter negotiation packet.

4. The method of claim 1, wherein receiving, by the first device, the change in the physical link parameter of the physical link connecting the first device and the second device is performed in response to the second device:

determining if the physical link parameter negotiation packet contains an identification of the first device that is identical to an identification of the first device saved on the second device, the identification of the first device saved on the second device received from the first device during negotiation of the physical link;

determining if the physical link parameter negotiation packet contains an identification of the first device that is identical to an actual identification of the second device; and verifying that the physical link parameter negotiation packet was sent from a physical partner if the physical link parameter negotiation packet contains an identification of the first device that is identical to an identification of the first device saved on the second device and the physical link parameter negotiation packet contains an identification of the second device that is identical to an actual identification of the second device.

5. A method for receiving a physical link parameter negotiation packet at a first device from a second device connected by a physical link, the method comprising:

after establishment of the physical link between the first device and the second device, receiving, by the first device, the physical link parameter negotiation packet from the second device via a layer-2 protocol, the physical link parameter negotiation packet configured as a layer-2 packet;

determining, by the first device, if the physical link parameter negotiation packet contains an identification of the second device that is identical to an identification of the second device saved on the first device, the identification of the second device saved on the first device received from the second device during negotiation of the physical link;

determining, by the first device, if the physical link parameter negotiation packet contains an identification of the first device that is identical to an actual identification of the first device;

verifying, by the first device, that the physical link parameter negotiation packet was sent from a physical partner if the physical link parameter negotiation packet contains an identification of the second device that is identical to an identification of the second device saved on the first device and the physical link parameter negotiation packet contains an identification of the first device that is identical to an actual identification of the first device;

negotiating a change in an amount of power over Ethernet received by the first device from the second device from a first power level to a second power level, the second power level being greater than the first power level, while the first device and the second device maintain the physical link there between; and receiving a change in the amount of power over Ethernet received by the first device from the second device from the first power level to the second power level while the first device and the second device maintain the physical link there between.

6. The method of claim 5, wherein the determining if the physical link parameter negotiation packet contains an identification of the second device that is identical to an identification of the second device saved on the first device includes retrieving an identification of the second device from a source identification field of the physical link parameter negotiation packet.

7. The method of claim 5, wherein the determining if the physical link parameter negotiation packet contains an identification of the first device that is identical to an actual identification of the first device includes retrieving an identification of the first device from a destination identification field of the physical link parameter negotiation packet.

8. The method of claim 5, wherein receiving the physical link parameter negotiation packet comprises receiving, by the first device from the second device, a request for a change in the physical link parameter of the physical link connecting the first device and the second device.

9. An apparatus for transmitting a physical link parameter negotiation packet from a first device to a second device connected by a physical link, the apparatus comprising:

a device identification packet inserter configured to insert an identification of the first device into the physical link parameter negotiation packet, the physical link parameter negotiation packet configured as a layer-2 packet;

a partner device identification packet inserter configured to insert an identification of the second device into the packet, the identification of the second device received from the second device during negotiation of the physical link; and a partner device packet transmitter coupled to the device identification packet inserter and to the partner device identification packet inserter, the partner device packet transmitter configured to transmit the physical link parameter negotiation packet to the second device via a layer-2 protocol;

wherein, when transmitting the physical link parameter negotiation packet to the second device via the layer-2 protocol, the first device is configured to identify to the second device, via the physical link parameter negotiation packet, the first device as a device that is physically connected to the second device and negotiate with the second device, via the physical link parameter negotiation packet, a change in a physical link parameter associated with the physical link between the first device and the second device while the first device and the second device maintain the physical link there between;

the first device is further configured receive, from the second device, a change in the physical link parameter of the physical link connecting the first device and the second device in response to transmitting the physical link parameter negotiation packet to the second device;

wherein when negotiating the change in a physical link parameter associated with the physical link between the first device and the second device, the first device is configured to negotiate a change in an amount of power over Ethernet received by the first device from the second device from a first power level to a second power level, the second power level being greater than the first power level, while the first device and the second device maintain the physical link there between; and wherein when receiving the change in the physical link parameter of the physical link connecting the first device and the second device the first device is configured to receive, from the second device, a change in the amount of power over Ethernet received by the first device from the second device from the first power level to the second power level while the first device and the second device maintain the physical link there between.

10. The apparatus of claim 9, wherein the device identification packet inserter includes a device identification source identification field packet inserter.

11. The apparatus of claim 9, wherein the partner device identification packet inserter includes a partner device identification destination identification field packet inserter.

12. The apparatus of claim 9, wherein the device identification packet inserter inserts an identification of the first device into the physical link parameter negotiation packet.

13. The apparatus of claim 9, wherein the partner device identification packet inserter inserts an identification of the second device into the physical link parameter negotiation packet, the identification of the second device received from the second device during negotiation of the physical link.

14. An apparatus for receiving a physical link parameter negotiation packet at a first device from a second device connected by a physical link, the apparatus comprising:

an identical partner device identification packet determiner configured to receive the physical link parameter negotiation packet from the second device via a layer-2 protocol, the physical link parameter negotiation packet configured as a layer-2 packet and determine if the physical link parameter negotiation packet contains an identification of the second device that is identical to an identification of the second device saved on the first device, the identification of the second device saved on the first device received from the second device during negotiation of the physical link;

an identical device identification packet determiner configured to determine if the physical link parameter negotiation packet contains an identification of the first device that is identical to an actual identification of the first device;

a packet physical partner verifier coupled to the identical partner device identification packet determiner and to the identical device identification packet determiner, the packet physical partner verifier configured to verify that the physical link parameter negotiation packet was sent from a physical partner if the physical link parameter negotiation packet contains an identification of the second device that is identical to an identification of the second device saved on the first device and the physical link parameter negotiation packet contains an identification of the first device that is identical to an actual identification of the first device;

wherein, the apparatus is configured to:

negotiate a change in an amount of power over Ethernet received by the first device from the second device from a first power level to a second power level, the second power level being greater than the first power level, while the first device and the second device maintain the physical link there between; and receive a change in the amount of power over Ethernet received by the first device from the second device from the first power level to the second power level while the first device and the second device maintain the physical link there between.

15. The apparatus of claim 14, wherein the identical partner device identification packet determiner includes a source identification field packet retriever.

16. The apparatus of claim 14, wherein the identical device identification packet determiner includes a destination identification field packet retriever.

17. The apparatus of claim 14, wherein the identical partner device identification packet determiner determines if the packet contains an identification of the second device that is identical to an identification of the second saved on the first device, the identification of the second device saved on the first device received from the second device during negotiation of the physical link.

18. The apparatus of claim 14, wherein the identical device identification packet determiner determines if the physical link parameter negotiation packet contains an identification of the first device that is identical to an actual identification of the first device.

19. The apparatus of claim 14, wherein the packet physical partner verifier verifies that the physical link parameter negotiation packet was sent from a physical partner if the physical link parameter negotiation packet contains an identification of the partner device that is identical to an identification of the second device saved on the first device and the physical link parameter negotiation packet contains an identification of the first device that is identical to an actual identification of the first device.

20. An apparatus for transmitting a physical link parameter negotiation packet from a first device to a second device connected by a physical link, the apparatus comprising:

means for inserting an identification of the first device into the physical link parameter negotiation packet, the physical link parameter negotiation packet configured as a layer-2 packet;

means for inserting an identification of the second device into the packet, the identification of the second device received from the second device during negotiation of the physical link; and means for transmitting the physical link parameter negotiation packet to the second device via a layer-2 protocol;

wherein means for transmitting the physical link parameter negotiation packet to the second device via a layer-2 protocol comprises means for identifying to the second device, via the physical link parameter negotiation packet, the first device as a device that is physically connected to the second device and means for negotiating with the second device, via the physical link parameter negotiation packet, a change in a physical link parameter associated with the physical link between the first device and the second device while the first device and the second device maintain the physical link there between;

further comprising means for receiving, by the first device from the second device, a change in the physical link parameter of the physical link connecting the first device and the second device in response to transmitting the physical link parameter negotiation packet to the second device;

wherein means for negotiating the change in a physical link parameter associated with the physical link between the first device and the second device comprises means for negotiating a change in an amount of power over Ethernet received by the first device from the second device from a first power level to a second power level, the second power level being greater than the first power level, while the first device and the second device maintain the physical link there between; and means for receiving the change in the physical link parameter of the physical link connecting the first device and the second device comprises means for receiving, from the second device, a change in the amount of power over Ethernet received by the first device from the second device from the first power level to the second power level while the first device and the second device maintain the physical link there between.

21. An apparatus for receiving a physical link parameter negotiation packet at a first device from a second device connected by a physical link, the apparatus comprising:

means for receiving the physical link parameter negotiation packet from the second device via a layer-2 protocol, the physical link parameter negotiation packet configured as a layer-2 packet;

means for determining if the physical link parameter negotiation packet contains an identification of the second device that is identical to an identification of the second device saved on the first device, the identification of the second device saved on the first device received from the second device during negotiation of the physical link;

means for determining if the physical link parameter negotiation packet contains an identification of the first device that is identical to an actual identification of the first device;

means for verifying that the physical link parameter negotiation packet was sent from a physical partner if the physical link parameter negotiation packet contains an identification of the second device that is identical to an identification of the second device saved on the first device and the physical link parameter negotiation packet contains an identification of the first device that is identical to an actual identification of the first device;

means for negotiating a change in an amount of power over Ethernet received by the first device from the second device from a first power level to a second power level, the second power level being greater than the first power level, while the first device and the second device maintain the physical link there between; and means for receiving a change in the amount of power over Ethernet received by the first device from the second device from the first power level to the second power level while the first device and the second device maintain the physical link there between.

22. A program storage device readable by a first device, embodying a program of instructions executable by the first device to perform a method, the method comprising:

inserting an identification of the first device into the physical link parameter negotiation packet, the physical link parameter negotiation packet configured as a layer-2 packet;

inserting an identification of a second device into the packet, the identification of the second device received from the second device during negotiation of the physical link; and transmitting the physical link parameter negotiation packet to the second device via a layer-2 protocol;

wherein transmitting the physical link parameter negotiation packet to the second device via a layer-2 protocol comprises identifying to the second device, via the physical link parameter negotiation packet, the first device as a device that is physically connected to the second device and negotiating with the second device, via the physical link parameter negotiation packet, a change in a physical link parameter associated with the physical link between the first device and the second device while the first device and the second device maintain the physical link there between;

receiving a change in the physical link parameter of the physical link connecting the first device and the second device in response to transmitting the physical link parameter negotiation packet to the second device;

wherein negotiating the change in a physical link parameter associated with the physical link between the first device and the second device comprises negotiating a change in an amount of power over Ethernet received by the first device from the second device from a first power level to a second power level, the second power level being greater than the first power level, while the first device and the second device maintain the physical link there between; and wherein receiving the change in the physical link parameter of the physical link connecting the first device and the second device comprises receiving, from the second device, a change in the amount of power over Ethernet received by the first device from the second device from the first power level to the second power level while the first device and the second device maintain the physical link there between.

23. A program storage device readable by a first device, embodying a program of instructions executable by the first device to perform a method, the method comprising:

receiving the physical link parameter negotiation packet from a second device via a layer-2 protocol, the physical link parameter negotiation packet configured as a layer-2 packet;

determining if the physical link parameter negotiation packet contains an identification of a second device that is identical to an identification of the second device saved on the first device, the identification of the second device saved on the first device received from the second device during negotiation of the physical link;

determining if the physical link parameter negotiation packet contains an identification of the first device that is identical to an actual identification of the first device;

verifying that the physical link parameter negotiation packet was sent from a physical partner if the physical link parameter negotiation packet contains an identification of the second device that is identical to an identification of the second device saved on the first device and the physical link parameter negotiation packet contains an identification of the first device that is identical to an actual identification of the first device;

negotiating a change in an amount of power over Ethernet received by the first device from the second device from a first power level to a second power level, the second power level being greater than the first power level, while the first device and the second device maintain the physical link there between; and receiving a change in the amount of power over Ethernet received by the first device from the second device from the first power level to the second power level while the first device and the second device maintain the physical link there between.

24. The method of claim 8 further comprising, in response to verifying that the physical link parameter negotiation packet was sent from a physical partner, transmitting, by the first device to the second device, a change in the physical link parameter of the physical link connecting the first device and the second device.

* * * * *

UNITED STATES PATENT AND TRADEMARK OFFICE
CERTIFICATE OF CORRECTION

PATENT NO. : 7,613,127 B2  Page 1 of 1
APPLICATION NO. : 11/075189
DATED : November 3, 2009
INVENTOR(S) : Jonnala et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 714 days.

Signed and Sealed this

Nineteenth Day of October, 2010

David J. Kappos
*Director of the United States Patent and Trademark Office*